United States Patent [19]
Gates, Jr.

[11] 3,956,591
[45] May 11, 1976

[54] TWO-INPUT AUTOMATIC SOURCE SELECTOR FOR STEREO ENTERTAINMENT CENTER

[76] Inventor: William A. Gates, Jr., 3228 E. Delcoa Drive, Phoenix, Ariz. 85032

[22] Filed: Dec. 18, 1974

[21] Appl. No.: 533,926

[52] U.S. Cl. .......................... 179/1 SW; 179/1 VC; 179/1 G
[51] Int. Cl.² ..................... G09B 5/04; H04R 5/00
[58] Field of Search ............ 179/1 SW, 1 VC, 1 VL, 179/1 B, 1 G, 100.1 VC; 340/148

[56] References Cited
UNITED STATES PATENTS

| | | | |
|---|---|---|---|
| 2,766,378 | 10/1956 | Sundin et al. | 179/1 SW |
| 3,493,681 | 2/1970 | Richards | 179/1 SW |
| 3,518,375 | 6/1970 | Hawkins | 179/1 VC |
| 3,809,812 | 5/1974 | Smith | 179/1 SW |

OTHER PUBLICATIONS
"Hi–Fi System Switching" by Vissers in *Radio & Television News*, May, 1955.

*Primary Examiner*—Douglas W. Olms
*Attorney, Agent, or Firm*—Warren F. B. Lindsley

[57] ABSTRACT

An automatic electronic control system for a home entertainment center, the system utilizing audio signal sensors for the preferential selection of a record player or tape deck as a signal source but with provision for returning to a tuner upon the cessation of the signal from either of the preferred sources.

5 Claims, 4 Drawing Figures

TWO-INPUT AUTOMATIC SOURCE SELECTOR FOR STEREO ENTERTAINMENT CENTER

BACKGROUND OF THE INVENTION

A wide variety of equipment is currently available for use in the home to provide high quality musical entertainment. A typical home entertainment center of this type includes stereo record players, magnetic tape decks and AM-FM tuners, all of which are selectably employed to drive a dual channel amplifier and speaker system. A major disadvantage of such systems, however, is that their operation often becomes a nuisance for the operator because of the constant attention required by the complex combination of equipment. This is especially objectionable when the center is put to use as a means for providing background music at a social event when the host is busy attending to other matters. It would be a great convenience in such cases if the host could set the phonograph or the tape deck in operation and then forget it, knowing that when all the records or tapes had run out, the equipment would automatically switch to the tuner and continue operating in that mode until he again had an opportunity to set up a new stack of records or install a new tape.

SUMMARY OF THE INVENTION

In accordance with the invention claimed, an automatic selection system is provided for use with a stereo home entertainment center, the system serving to greatly simplify the control of the system and relieving the operator of the need to give his constant attention to maintaining its operation.

It is therefore one object of this invention to provide an automatic control system for a home entertainment center of a type that typically includes a phonograph (record player), a tape deck and an AM-FM tuner.

Another object of this invention is to provide in such a system a capability for the system to select automatically an audio signal from the phonograph or from the tape deck when such a signal is present and to return automatically to the tuner at the termination of the playing of a number of records or of a tape deck, the system responding in this case to the termination of the audio signal from the phonograph or the tape channel.

A further object of this invention is to provide such an automatic control feature by a means which is dimensionally compact and which is so inexpensive as to prove economically attractive for use in the typical home entertainment center.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which.

DESCRIPTION OF THE PREFERRED EMBODIMENT

Figure 1:
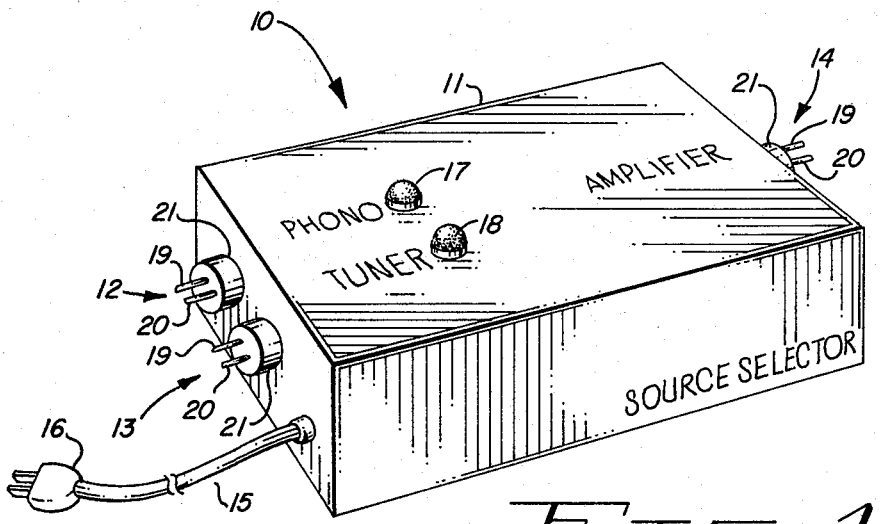
FIG. 1 is a perspective view of the automatic audio source selector embodying the present invention.

Referring more particularly to the drawings by characters of reference, FIG. 1 discloses an automatic audio SOURCE SELECTOR 10 for use with a stereo sound system, the selector 10 comprising a metal chassis 11, two input connectors 12 and 13, an output connector 14, a power cord 15 with a power plug 16 for connection to a conventional utility outlet, and two indicator lamps, 17 and 18. Each of the two input connectors 12 and 13 and the output connector 14 has two pins or terminals 19 and 20 for connection to left and right audio stereo signal lines, respectively, and an outer collar 21 which is the reference or ground conductor.

Input connector 12 is for connection of an input signal from a stereo dynamic phono source in a first embodiment or from a stereo tape deck in a second embodiment. Input connector 13 is for connection of an input signal from a stereo tuner source, and output connector 14 is for connection to the input of an audio amplifier and speaker system.

When plug 16 is inserted in a utility outlet and when input sources and the output amplifier are connected for operation, the SOURCE SELECTOR 10 senses for the presence of an audio signal originating from the phono source connected at connector 12. If an audio signal from the phono source is present, the phono signal is selected whether or not there is a signal present originating from the tuner connected at connector 13, and the phono signal is amplified and transmitted to output connector 14 for amplification and delivery to the speaker system. If there is no phono signal present, the tuner signal connected at connector 13 is amplified and transmitted to the output terminal 14 for amplification. Lamp 17 is a light-emitting-diode (LED) and is energized during the presence of a phono signal. Lamp 18 is also as LED and is energized when there is no phono signal present and thus when the tuner signal is being transmitted.

In a more generalized application of the equipment, input connectors 12 and 13 can be made to accommodate any of a number of signal sources including those mentioned in numerous combinations, e.g., two tape sources, two phono sources, two tuner sources, a tape source and a phono source, etc. Similarly, the output from terminal 14 could be connected to a recorder, a broadcast transmitter or to other such equipment.

Figure 2:
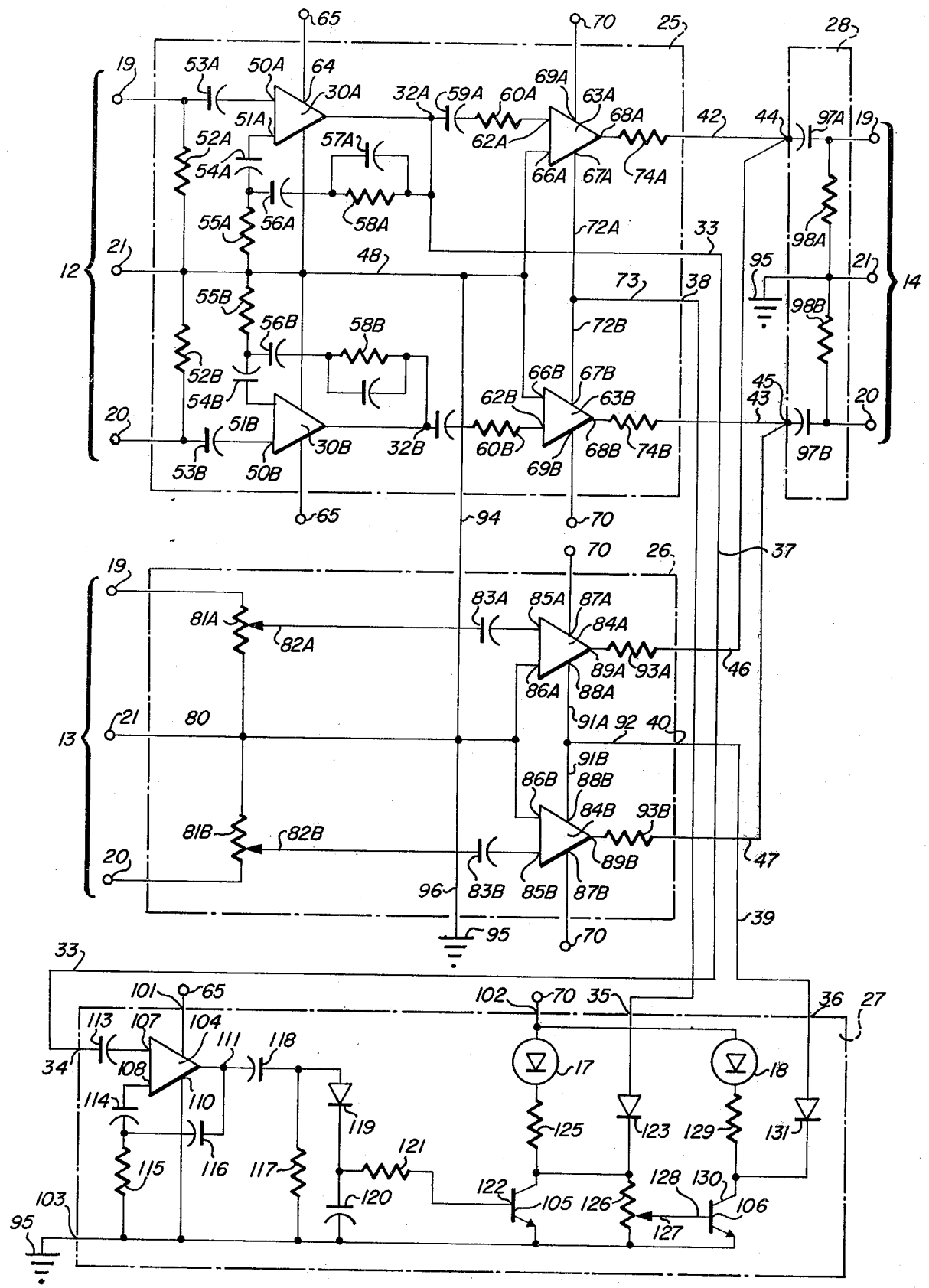
FIG. 2 is a wiring diagram showing the electronic implementation of a first embodiment of the invention.

The electronic circuits contained within chassis 11 are organized within a number of circuit blocks as illustrated in FIG. 2, the blocks including first and second electronic switches 25 and 26, a sensing and control circuit 27 and an output network 28.

The relationship between FIGS. 1 and 2 is indicated by the correspondence between characters of reference, e.g., switch 25 has two input terminals 19 and 20 and outer collar 21 which serves as a ground terminal, the group of three terminals being identified by the numeral 12 which corresponds to input connector 12 of FIG. 1. Similarly, group 13 comprising three terminals 19, 20 and 21 corresponds to connector 13 of FIG. 1, and group 14 corresponds to connector 14 of FIG. 1. In addition, lamps 17 and 18 of FIG. 1 correspond to LED's 17 and 18, respectively, of FIG. 2.

General operation of the circuits of FIG. 2 occurs as follows: Assuming that phono and tuner signals are both present at connectors 12 and 13, respectively, the phono signals connected at left and right input terminals 19 and 20, respectively, are amplified by preamplifiers 30A and 30B. The signal at output terminal 32A of amplifier 30A is carried by line 33 to input terminal 34 of sensing and control circuit 27. When such a signal is present at terminal 34, circuit 27 produces a ground or zero potential signal at its first output terminal 35 and a positive voltage at its second output terminal 36. The ground signal present at terminal 35 is transmitted by line 37 to control terminal 38 of switch 25 and the positive voltage from terminal 36 is transmitted by line 39 to control terminal 40 of switch 26. The ground signal at control terminal 38 of switch 25 enables switch 25 and allows the phono signal to be passed by switch 25 to output busses 42 and 43 while the positive signal supplied to control terminal 40 of switch 26 disables switch 26 and causes it to block the signal from the tuner connected at connector 13. The phono signal is thus carried by busses 42 and 43 to input terminals 44 and 45 of output network 28 which passes then on to SOURCE SELECTOR output terminals 19 and 20 of connector 14.

If, on the other hand, there is no phono signal present, the consequent absence of a signal at output terminal 32A of amplifier 30A, on line 33, and at input terminal 34 of circuit 27 produces a positive signal at output terminal 35 and a ground signal at output terminal 36 of circuit 27. The positive signal at terminal 35 is transmitted by line 37 to control terminal 38 of switch 25, thereby disabling switch 25 to block the phono channel and the ground signal from output terminal 36 is carried by line 39 to control terminal 40 of switch 26 to enable switch 26 allowing it to pass the tuner signal to output busses 46 and 47 and thence to input terminals 44 and 45 of network 28 for transmission to SOURCE SELECTOR output connector 14.

Switches 25 and 26 are thus seen to be similar in function although switch 25 is more complex than switch 26. The additional complexity of switch 25 arises from the necessity to provide preamplification of the phono signal because of its relatively lower power level.

Dwelling now in greater detail on the description of switch 25, switch 25 has identical upper and lower channels lying above and below ground bus 48, the upper channel being provided to accommodate the left hand stereo signal connected at input terminal 19 and the lower channel being provided to accommodate the right-hand stereo signal connected at input terminal 20. Suffixes A and B further differentiate between upper and lower channels while corresponding numerical characters indicate corresponding components and functions. Because of the identity in terms of circuit configuration and functions, the description will now be limited to the upper channel.

Amplifier 30A is a commercially available integrated circuit amplifier of a type similar to RCA 3048 connected as a conventional pre-amplifier and having a supply terminal 64 connected to +13 volt supply terminal 65, an input terminal 50A, a feedback terminal 51A, and an output terminal 32A. The signal from SELECTOR input terminal 19 is terminated at terminal 19 by terminating resistor 52A which is connected between terminal 19 and ground terminal 20 and the signal is coupled from terminal 18 to amplifier input terminal 50A by coupling capacitor 53A. To provide an identical input impedance characteristic at feedback terminal 51A, a capacitor 54A and a resistor 55A are serially connected between terminal 51A and ground bus 48. A feedback network comprising a capacitor 56A serially connected with a parallel RC network including capacitor 57A and resistor 58A is connected between output terminal 32A and the junction between capacitor 54A and resistor 55A. The feedback network comprising resistors 55A, 58A and capacitors 54A, 56A and 57A is designed to provide a frequency response of a particular desire characteristic known as the RIAA phono equalization curve.

The output signal from terminal 32A is coupled by serially connected capacitor 59A and resistor 60A to input terminal 62A of voltage controlled amplifier 63A.

Amplifier 63A is a commercially available integrated circuit again similar to the Motorola MFC 6040. It has in addition to its input terminal 62A a ground terminal 66A, and a control terminal 67A, an output terminal 68A and a supply terminal 69A. Ground terminal 66A is connected directly to ground bus 48 and supply terminal 69A is connected to +15V supply terminal 70. A control terminal 67A is connected by means of lines 72A and 73 to control terminal 38. Unless control terminal 38 is grounded by virtue of the action of circuit 27, the effect on amplifier 63A is the same as if no supply voltage were connected at terminal 69A, i.e., the amplifier is inoperative and does not pass signals from input terminal 62A to output terminal 68A. The output signal from amplifier 63A is connected by series resistor 74A and line 42 to input terminal 44 of network 28.

Switch 26 is also characterized by identical upper and lower channels lying above and below ground bus 80, the upper and lower channels again accommodating left and right hand stereo channels and again differentiated by A and B suffixes added to reference characters. Describing again only the upper channel, input terminal 19 is terminated to ground bus 80 by a volume control potentiometer 81A which is employed as a volume control. The signal taken from movable tap 82A of potentiometer 81A is coupled by means of coupling capacitor 83A to voltage controlled amplifier 84A. Amplifier 84A is identical in form, connections and functions to amplifier 63A of swtich 25. It has an input terminal 85A, a ground terminal 86A, a source terminal 87A, and a control terminal 88A and an output terminal 89A. Ground terminal 86A is connected to ground bus 80, source terminal 87A is connected to +15V supply terminal 70 and control terminal 88A is connected by lines 91A and 92 to control terminal 40. The signal at output terminal 89A is connected by series resistor 93A to bus 46 which carries the signal to input terminal 44 of network 28.

Ground bus 48 is connected to ground bus 80 by line 94, and bus 80 is tied to chassis ground terminal 95 by line 96.

Output network 28 has a series coupling capacitor 97A between its input terminal 44 and its output terminal 19 and an identical series coupling capacitor 97B between its input terminal 45 and output terminal 20. Terminating resistors 95A and 98B are connected from terminals 19 and 20, respectively, to ground terminal 95.

Sensing and control circuit 27 has an input terminal 34, source terminals 101 and 102, output terminals 35 and 36 and ground terminal 103. Source terminal 101 is connected to +12V supply terminal 65, source terminal 102 is connected to +15V supply terminal 70 and ground terminal 103 is connected to chassis ground terminal 95.

The electronic circuits internal to circuit 27 includes integrated circuit amplifier 104 connected as a high-gain a-c amplifier, a d-c switch involving transitor 105 and an inverter involving transistor 106.

Amplifier 104 is again similar to the RCA 3048 having an input terminal 107, a feedback terminal 108, a source terminal 109 connected to terminal 101 of circuit 27 and +12V supply terminal 65, a ground terminal 110 and an output terminal 111. Ground terminal 110 is tied to ground bus 112 which connects to ground terminal 103 and chassis ground terminal 95. Input terminal 107 is coupled to terminal 34 by coupling capacitor 113. Feedback terminal 108 is terminated to ground bus 112 by serially-connected capacitor 114 and resistor 115, the resistor connecting to bus 112 and the capacitor to terminal 108. A feedback capacitor 116 is connected between output terminal 111 and the junction between capacitor 114 and resistor 115. Amplifier 104 and the above described peripheral components constitutes a high-gain a-c amplifier.

In the presence of an input signal at terminal 34, the above described high-gain amplifier converts the relatively low-level input signals to high amplitude output levels which saturate the output stage of amplifier 104. The output signal appearing at terminal 111 is impressed across resitor 117 via output coupling capacitor 118, and the a-c signal thus present across resistor 117 is rectified by diode 119, the positive half cycles being passed by diode 119 and supplying a charging current to storage capacitor 120, thus charging capacitor 120 to a relatively high positive voltage, which positive voltage produces a base drive current flowing through resistor 121 into the base 122 of transistor 105 causing transistor 105 to be turned on.

When transistor 105 is thus turned on, its collector voltage falls essentially to zero or ground potential and by virtue of the connection of line 37 and diode 123 from control terminal 38 to collector 124 of transistor 105, control terminal 38 is also drawn essentially to ground potential to enable switch 25. At the same time, a current flowing from +15V supply terminal 70 through LED 17 and resistor 125 to collector 124 energizes and illuminates LED 17, which is also lamp 17 of FIG. 1, serving to indicate the presence of a signal from the phono input connector 12.

Connected from collector 124 to ground bus 112 is a bias adjustment potentiometer 126. Its movable tap 127 is connected to the base 128 of transistor 106. When transistor 105 is turned on during the presence of a signal at terminal 34, the voltage present at tap 127 is very low and insufficient to supply base drive current to base 127 of transistor 106. Transistor 106 is thus turned off so that essentially no current flows through LED 18 and resistor 129 which are serially connected between +13 volt supply terminal 70 and collector 130 of transistor 106. Furthermore, diode 131 which connects control terminal 40 of switch 26 to collector 130 is reverse-biased and thus provided no path to ground for control terminal 40 so that switch 26 is not enabled at this time.

The combination of capacitor 120 and variable potentiometer 126 sets up the timing circuit for return to the prefered source after a predetermined time delay which is determined by setting of potentiometer 126.

If the signal at input terminal 34 momentarily disappears as during a short pause between audio signals, the charge on capacitor 120 sustains the base drive current to transistor 105, at the same time sustaining the conditions just described in connection with transistors 105 and 106 and control terminals 38 and 40.

If the signal at input terminal 34 remains at zero, however, as it will following the termination of a record that had been playing, the charge on capacitor 120 will be reduced eventually to too low a level to sustain base drive current to transistor 105. Transistor 105 then turns off, its collector voltage rising to a high positive value which reduces to a relatively low level the current through LED 17 and resistor 125, extinguishing the illumination of LED or lamp 17. At the same time, diode 123 is reverse-biased and no longer provides a path to ground from control terminal 38 so that switch 25 is disabled. Further, the relatively low level of current still flowing through LED 17 and resistor 125 now passes also through potentiometer 126 producing a sufficiently high voltage at movable tap 127 to supply base drive current into base 128 of transistor 106, which base drive current turns transistor 106 on causing its collector 130 to fall to a low voltage near ground potential. Terminal 40 is thus now provided a path to ground through line 39, diode 131 and transistor 106 so that switch 26 is enabled. At the same time a current flows from terminal 70 through LED 18, resistor 129 and transistor 106 to bus 112, this current illuminating LED or lamp 18 and indicating that the tuner signal is being selected due to the absence of a phono signal.

Figure 3:
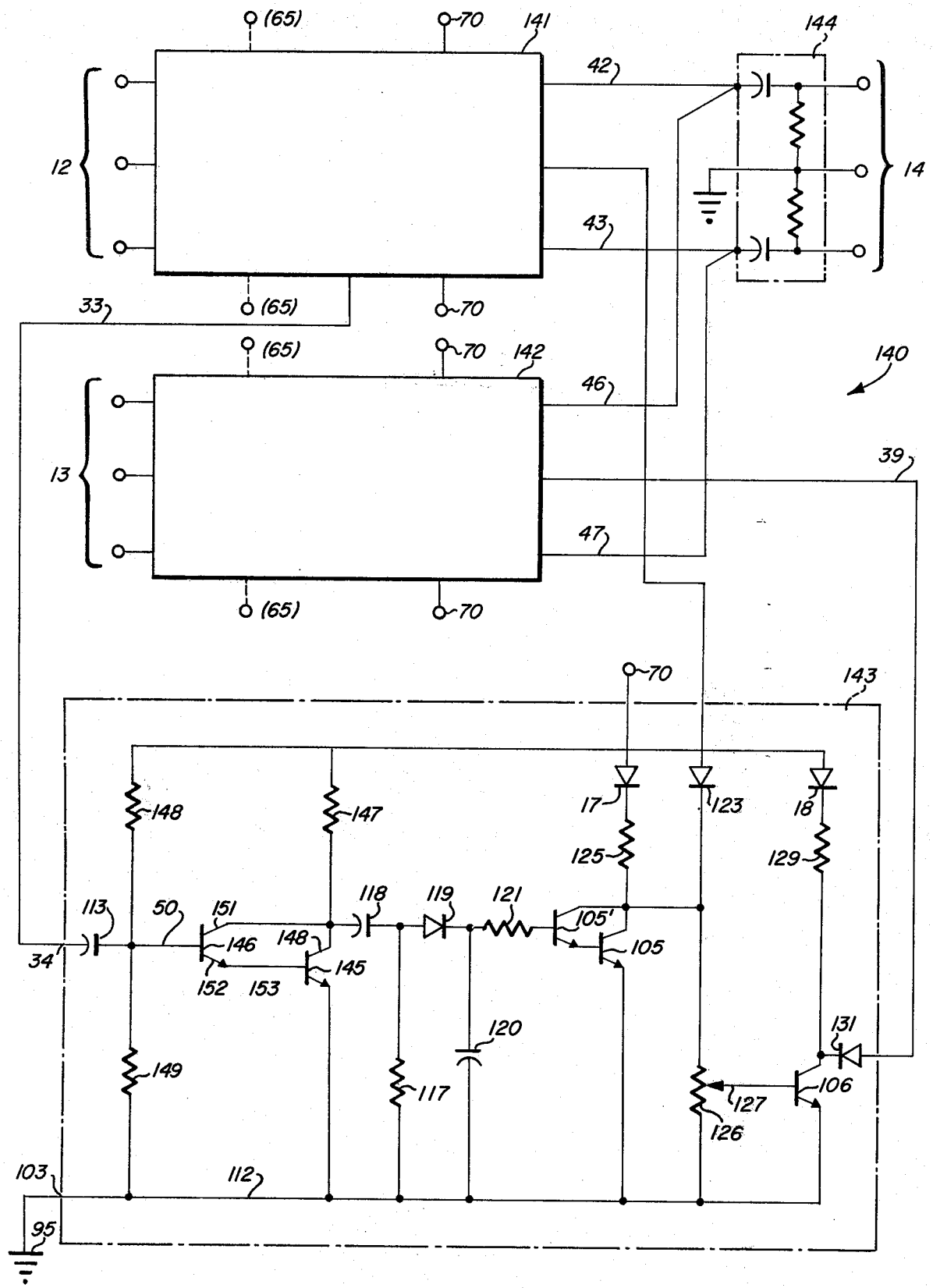
FIG. 3 is a wiring diagram showing the electronic implementation of a second embodiment of the invention.

By way of illustration that combination of signal sources other than phonographs and tuners may be employed, the more generalized source selector 140 is shown in FIG. 3 to include two switches 141 and 142, a sensing and control circuit 143 and an output network 144, the switches, the sensing and control circuit and the output network being inter-connected as before by signal lines 33, 42, 43, 46 and 47 and by control lines 37 and 39. In this case, however, each of the switches 141 and 142 may be identical either to switch 25 or to switch 26 as appropriate to meet the needs of any desired set of source signals connected at input connectors 12 and 13, the signal connected at 12 again having priority over the signal connected at 13.

The sensing and control circuit 143 of FIG. 3 is the same as the corresponding circuit 27 of FIG. 2 except that a Darlington pair 105–105' has replaced the single transistor 105 of FIG. 2 and the integrated circuit amplifier 104 has been replaced by a transistor amplifier in FIG. 3 including a second Darlington pair comprising transistors 145 and 146. All components having direct correspondence between circuit 27 of FIG. 2 and circuit 143 of FIG. 3 have the same characters of reference. Amplifier 27 is intended to be used when one of the audio switches is a phono input such as switch 25 of FIG. 2.

Amplifier 143 is intended to be used when both audio switches are like switch 26 of FIG. 2. Because of the high audio level of these inputs there is not the requirement of a high degree of gain in the a-c amplifier of 143 of FIG. 3.

The substitution of Darlington pair 105–105' has the purpose of providing additional gain over that available from a single transistor 105 with the result that a much lower value of base drive from capacitor 120 is now effective in holding transistor 105 in a turned-on condition. A much longer pause between audio signals can thus now be tolerated, even with the same value of capacitance for capacitor 120.

The Darlington pair 145–146 with its common-collector resistor 147 connected to plus 15 volt supply terminal 70 receives its base biasing voltage from the center-point of a resistive divider network including resistors 148 and 149 serially connected between supply terminal 70 and ground bus 112. The input signal from terminal 34 is coupled by capacitor 113 to base 150 of transistor 146. Transistor 146 amplifies the a-c signal appearing at base 150 and supplies an amplified current flowing from its collector 151 to its emitter 152 into base 153 of transistor 145. A much amplified signal current flows as a result from terminal 70, through resistor 147 and transistor 145 to bus 112, the much amplified signal current producing a very high level signal at the collector 148 of transistor 145, the positive half cycles again being passed by diode 119 to charge capacitor 120 and supply base drive to transistor 106. Overall operation of circuit 143 as well as its response to the presence or absence of a signal at its input terminal 34 will thus be found essentially identical to that of circuit 27 of FIG. 2, but its performance may in some cases prove somewhat superior because of the additional delay it can tolerate between audio signals. One variation may in some cases also be preferred over the other because of component availability or relative costs.

Figure 4:
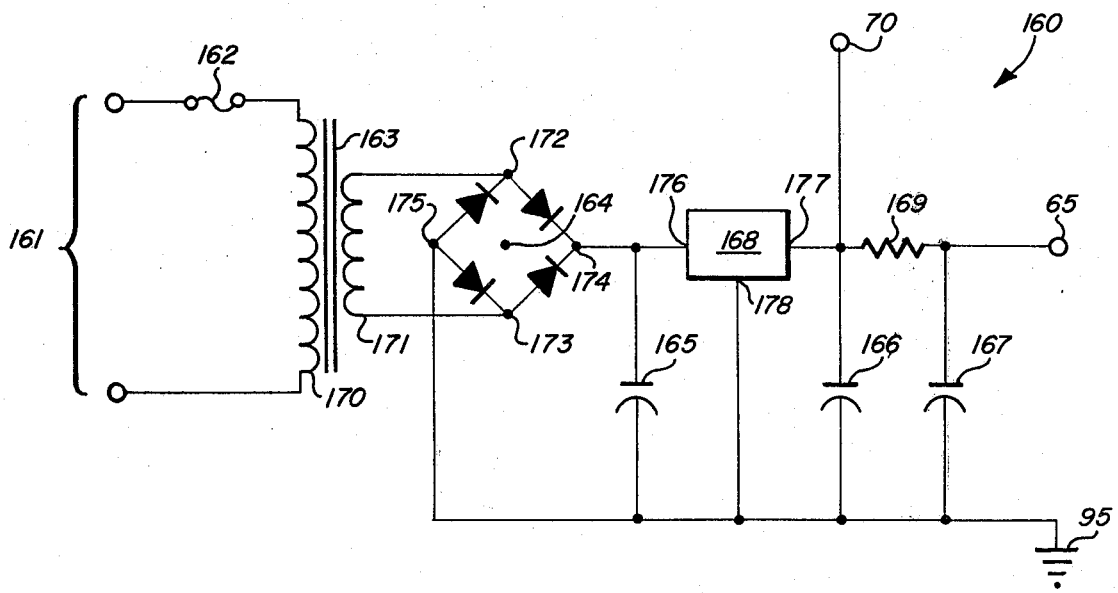
FIG. 4 is a wiring diagram of a typical power supply circuit appropriate for use with the equipment and circuits illustrated in FIGS. 1–3.

FIG. 4 illustrates a typical power supply circuit 160 which is suitable to supply the +13 volt and the +15 volt potentials at terminals 65 and 70 of FIG. 2 and FIG. 3. The circuit 160 comprises a-c input terminals 161, fuse 162, step down transformer 163, bridge rectifier 164, filter capacitors 165, 166 and 167, integrated circuit regulator 168, dropping resistor 169, chassis ground terminal 95 and output terminals 65 and 70.

The fuse 162 is connected for circuit protection in series with primary winding 170 of transformer 163 and the a-c source which is connected at terminals 161 by means of the power cord 15 of FIG. 1.

Secondary winding 171 of transformer 163 supplies a reduced a-c voltage to a-c terminals 172 and 173 of rectifier 164, and a rectified voltage is supplied by rectifier 164 at its positive and negative d-c terminals, 174 and 175, respectively, across which is connected filter capacitor 165.

Regulator 168 is a conventional three-terminal integrated circuit regulator readily available from a number of suppliers. It has an input terminal 176, an output terminal 177 and a ground terminal 178. If the d-c input voltage supplied at terminal 176 is within relatively broadly specified limits, its output voltage at terminal 177 will have a nominal value within a tolerance which is typically less than plus or minus one percent. In this case, the nominal output voltage is +15 volts.

The +15 volt output is supplied directly to terminal 70, and capacitor 156 connected from terminal 70 helps to stabilize regulator 158 and at the same time, serves as a low a-c impedance for pulsating loads connected at terminal 70.

The dropping resistor 169 connected between terminal 70 and terminal 65 produces approximately a two-volt drop in the presence of the relatively fixed load currents drawn at terminal 65 so that a potential of approximately 13 volts is realized as desired at terminal 65. Capacitor 167 provided filtering and a low a-c impedance at terminal 65.

A compact, economical and versatile SOURCE SELECTOR has been provided in accordance with the objects of the present invention, and while but a few embodiments have been illustrated and described, it will be apparent to those skilled in the art that various changes and modifications may yet be made therein without departing from the spirit of the invention or from the scope of the appended claims.

What is claimed is:

1. An automatic electronic source selector for use with a stereo sound system utilizing an audio signal sensor for the preferential selection of a first signal source with means for selecting a second signal source upon cessation of the signal from said first signal source, said source selector comprising:

a first group of input signal terminal means for connection to a preferential first multi-signal source, a second group of input signal terminal means for connection to a second multi-signal source, a group of output terminals for connection to a stereo audio signal output system, a pair of switching means, one of said pair of switching means connecting said first group of input signal terminal means to said output terminals and the other of said pair of switching means connecting the second group of input signal terminal means to said output terminals, a sensing and control circuit for controlling the connecting of each of said pairs of switching means to said output terminals, said sensing and control circuit comprising a sensor connected to said first group of input signal means, means for transmitting signals from said sensing and control circuit at any time upon receipt of a given signal from said sensor for controlling both of said pairs of switching means to cause the transmittal of signals from said first group of input signal terminals through said one of said pairs of switch means to said output terminals and to cause said other of said pair of said switching means to block signals from being transmitted from said second group of input signal terminal means to said output terminals, said sensing and control means upon sensing the absence of signals on at least one of the terminals of said first group of input signal terminals actuating said other of said switching means to connect said second group of input signal terminals to said output terminals, said sensing and control circuit being provided with a time delay means for delaying the connection of said second group of input signal terminals to said output terminals upon sensing the absence of signals on said first group of input signal terminals whereby short interruptions of signals on said first group of input signal terminals will not cause a switching of said source selector.

2. The automatic electronic source selector set forth in claim 1 wherein;

said first group of input terminals being connectable to a stereo phono source, and said one of said pair of switching means comprising an amplifier for amplifying the signals from said first multisignal source transmitted to said output terminals.

3. The automatic electronic source selector set forth in claim 1 wherein:
   said time delay comprises a potentiometer for varying the length of said time delay.

4. The automatic electronic source selector set forth in claim 1 wherein:
   said first and second groups of input signal terminals being connectable to different stereo signal sources of a tape, tuner or phono type.

5. The automatic electronic source selector set forth in 4 wherein:
   said sensor comprises an audio sensing means.

* * * * *